US006449407B1

(12) United States Patent
Kiang et al.

(10) Patent No.: US 6,449,407 B1
(45) Date of Patent: Sep. 10, 2002

(54) OPTICAL SWITCH HAVING EQUALIZED BEAM SPREADING IN ALL CONNECTIONS

(75) Inventors: Meng-Hsiung Kiang; Behrang Behin, both of Berkeley; Michael Daneman, Pacifica; Kam Yin Lau, Danville, all of CA (US)

(73) Assignee: Orix Microsystems, Inc., Richmond, CA (US)

( * ) Notice: Subject to any disclaimer, the term of this patent is extended or adjusted under 35 U.S.C. 154(b) by 0 days.

(21) Appl. No.: 09/518,751

(22) Filed: Mar. 3, 2000

(51) Int. Cl.[7] .............................. G02B 6/35; G02B 6/293
(52) U.S. Cl. ........................... 385/18; 359/128; 385/17; 385/24
(58) Field of Search ................................. 385/16–18, 24; 359/124, 127, 128, 129

(56) References Cited

U.S. PATENT DOCUMENTS

| | | | |
|---|---|---|---|
| 4,932,745 A | 6/1990 | Blonder | 350/96.2 |
| 5,043,043 A | 8/1991 | Howe et al. | 156/645 |
| 5,774,604 A | 6/1998 | McDonald | 385/18 |
| 6,031,946 A | 2/2000 | Bergmann et al. | 385/18 |
| 6,091,867 A | * 7/2000 | Young et al. | 385/17 |
| 6,163,387 A | * 12/2000 | Han | 358/487 |
| 6,259,835 B1 | * 7/2001 | Jing | 385/18 |

FOREIGN PATENT DOCUMENTS

| | | | |
|---|---|---|---|
| EP | 0410619 A | 1/1991 | H04Q/3/52 |
| EP | 0955559 A | 10/1999 | G02B/6/35 |
| GB | 2014751 A | 8/1979 | G02B/5/14 |

OTHER PUBLICATIONS

Raanan A. Miller et al, An Electromagnetic MEMS 2 × 2 Fiber Optic Bypass Switch, Jun. 17, 1997, pp. 89–92, 1997 Int. Conf. on Solid–State Sensors and Actuators (IEEE).

S.S. Lee et al, Surface–Micromachined Free–Space Fibre–optic Switches, Aug. 17, 1995, pp. 1481/1482, *Electronics Letters,* vol. 31, No. 17.

Cornel Marxer et al, Vertical Mirrors Fabricated by Deep Reactive Ion Etching for Fiber–Optic Switching Applications, Sep. 1997, pp. 277–285, *J. of Microelectromechanical Systems,* vol. 6, No. 3.

* cited by examiner

*Primary Examiner*—John D. Lee
(74) *Attorney, Agent, or Firm*—JDI Patent; Joshua D. Isenberg

(57) ABSTRACT

An optical switch module having a movable mirror disposed between two fixed mirrors. All three mirrors are aligned parallel to each other in a linear array to form a crossbar switch. The movable mirror moves between a first position and a second position to selectively couple optical signals between two inputs and two outputs. The basic switch module may be scaled up to form an apparatus that incorporates N movable mirrors and N+1 fixed mirrors, where N is an integer greater than zero. Such an apparatus can accommodate 2N fiber inputs and 2N fiber outputs, e.g., in an optical add/drop multiplexer (OADM). The parallel configuration of the switch module takes advantage of existing lens array and fiber V-groove technology to facilitate integration of the fibers and collimators in the module, thereby reducing the difficulty and cost associated with alignment, assembly, and packaging.

38 Claims, 6 Drawing Sheets

US 6,449,407 B1

OPTICAL SWITCH HAVING EQUALIZED BEAM SPREADING IN ALL CONNECTIONS

FIELD OF THE INVENTION

This invention relates generally to optical communications. More particularly, the invention relates to switches for fiber optic communications systems.

BACKGROUND ART

Silicon-micromachining technology has been used to fabricate micro-optical devices such as movable micromirrors in order to build miniaturized optical components and communications subsystems. Using silicon-micromachining and silicon optical bench technologies, extremely compact optical components and systems incorporating fiber optic technologies can be built for communication and test-and-measurement instrumentation applications.

Microelectromechanical systems (MEMS) are miniature mechanical devices manufactured using the techniques developed by the semiconductor industry for integrated circuit fabrication. Such techniques generally involve depositing layers of material that form the device, selectively etching features in the layer to shape the device and removing certain layers (known as sacrificial layers, to release the device. Such techniques have been used, for example, to fabricate miniature electric motors as described in U.S. Pat. No. 5,043,043.

Recently, MEMS devices have been developed for optical switching. Such systems typically include an array of mechanically actuatable mirrors that deflect light from one optical fiber to another. The mirrors are configured to translate or rotate into the path of the light from the fiber. Mirrors that rotate into the light path generally rotate about a substantially horizontal axis, i.e., they "flip up" from a horizontal position into a vertical position. MEMS mirrors may be actuated by magnetic interaction, electrostatic interaction, or some combination of both.

Modern fiber optic communication networks utilize fiber cable trunk lines containing a plurality of fiber optic strands for routing the traffic in the fibers to designated destinations. The number of fibers or optical ports continues to grow as the traffic load increases. Consequently multiple (>2) port fiberoptic components and subsystems are becoming more popular. Of particular interest are optical add/drop multiplexers (OADMs) that can be constructed using a micromirror array in conjunction with fiber arrays for optical inputs and outputs. As the number of add/drop/pass channels increases, the arrangement of the fibers in the array becomes critical as a proportional scaling of component size with channel count does not make an ideal solution for all applications.

A typical component of an optical communications system is an optical crossbar switch. Optical crossbar switches that utilize a single movable mirror are described, for example, in U.S. Pat. No. 4,932,745. FIG. 1A shows a typical 2×2 crossbar switch 100 of the prior art. The switch 100 optically couples light signals between inputs IN 1, and outputs Out 1, Out 2. The switch 100 generally comprises a mirror 102 movable disposed on a substrate 104. The mirror 102 includes reflecting surfaces on a front side 106 and a back side 108. The mirror 102 translates horizontally between a first position and a second position. In the first position the mirror 102 blocks direct optical paths between inputs IN 1, IN 2 and outputs Out 2, Out 1 respectively. Light from IN 1 reflects off the back surface 108 to Out 1. Light from IN 2 reflects off the front surface 106 to Out 2. In the second position, mirror 102 is removed from the direct path of light between the inputs and the outputs such that light from IN 1 travels directly to Out 2 and light from IN 2 travels directly to Out 1.

Switch 100 requires very precise alignment between the inputs and the outputs. Because the inputs are not parallel to each other, alignment of the inputs with the outputs is difficult. Furthermore, it is difficult, if not impossible to scale up the basic 2×2 crossbar switch to larger numbers of inputs and outputs. Furthermore, the input and output fibers have to be assembled individually, which is not conducive to the construction of large port-count components.

An alternative crossbar switch is described in U.S. Pat. No. 5,841917. FIGS. 2A–2B depict a crossbar switch 200 that is compatible with parallel arrays of inputs and outputs. The switch 200 generally comprises a 2×2 array of movable mirrors 2021, 2022, 2023, and 2024. The movable mirrors selectively couple two parallel inputs IN 1 and IN 2 to two parallel outputs Out 1 and Out 2 that are oriented at right angles to IN 1 and IN 2. Each mirror is oriented at an angle of approximately 45° with respect to the orientation of both the inputs and the outputs. Consequently mirrors 202 deflect the path of light beams from the inputs by 90° to direct them towards the outputs. As in the crossbar switch 100 of FIG. 1, two switching states are possible. For example, in FIG. 2A mirrors 2021 and 2024 are in an "up" position and mirrors 2022 and 2023 are in a "down" position. Mirror $202_1$ deflects light from input IN 1 toward output Out 1 while mirror 2024 deflects light from input IN 2 toward output Out 2. Alternatively, in FIG. 2B, mirrors $202_1$ and $202_4$ are in the "down" position and mirrors $202_2$ and $202_3$ are in the "up" position. Mirror $202_2$ deflects light from input IN 1 toward output Out 2 while mirror $202_3$ deflects light from input IN 2 toward output Out 1.

Because the inputs IN 1, IN 2 are parallel to each other and outputs Out 1, Out 2 in switch 200, alignment is greatly simplified. Furthermore, switch 200 may be readily scaled up to accommodate any number of fibers M in an MXM array, where M is an integer greater than 2. However, because the input fiber array and the output fiber array are oriented at an angle with respect to each other, alignment of the inputs and outputs with the mirrors is problematic. Furthermore, as the number of fibers M becomes large, the number of mirrors and the area they occupy, scales as $M^2$. Thus, for very large-scale arrays the switch occupies a large amount of space, which can be a serious disadvantage when the space available for the switch is limited.

There is a need, therefore, for an optical switching apparatus that is easier to align, uses fewer mirrors, and occupies less space.

OBJECTS AND ADVANTAGES

Accordingly, it is a primary object of the present invention to provide a layout for micromachined mirrors that facilitates the optimal arrangement of the mirrors. It is a further object of the invention to provide a layout that facilitates alignment of the input and output ports. It is an additional object of the invention to provide a layout for an optical switching module that facilitates miniaturization the dimensions of the resulting components or subsystems.

SUMMARY

These objects and advantages are achieved by the present invention of an optical switch module, comprising at least two fixed mirrors and at least one movable mirror. In a first embodiment, the movable mirror is typically disposed between the two fixed mirrors with all three mirrors aligned parallel to each other in a linear array to form a crossbar switch. The mirrors couple optical signals between two or more inputs and two or more outputs. The movable mirror is movable between a first position and a second position. In the first position, a first fixed mirror and the movable mirror deflect light from a first input to a first output and light from a second input to a second output. The movable mirror and a second fixed mirror deflect light from a second input to a second output. In the second position, the first and second fixed mirrors deflect light from the first input to the second output and light from the second input travels straight to the second output.

In a second embodiment, the basic switch module may be scaled up to form an apparatus that incorporates N movable mirrors and N+1 fixed mirrors, where N is an integer greater than zero. Such an apparatus can accommodate 2N fiber inputs and 2N fiber outputs. According to a third embodiment of the invention, the apparatus implements an optical add/drop multiplexer (OADM). The multiplexer includes a number of add ports coupled to selected inputs and a number of drop ports coupled to selected outputs. The add ports allow a local device to receive information from a main input fiber. The drop ports allow a local device to send information to a main output fiber.

In a third embodiment of the invention a crossbar switch is fabricated with inputs and outputs arranged in collimated fiber arrays. A parallel configuration of the fibers and the collimators facilitate fabrication of the apparatus and alignment of the input fibers. The parallel configuration of the switch module takes advantage of existing lens array and fiber V-groove technology to facilitate integration of the fibers and collimators in the module, thereby reducing the difficulty and cost associated with alignment, assembly, and packaging.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
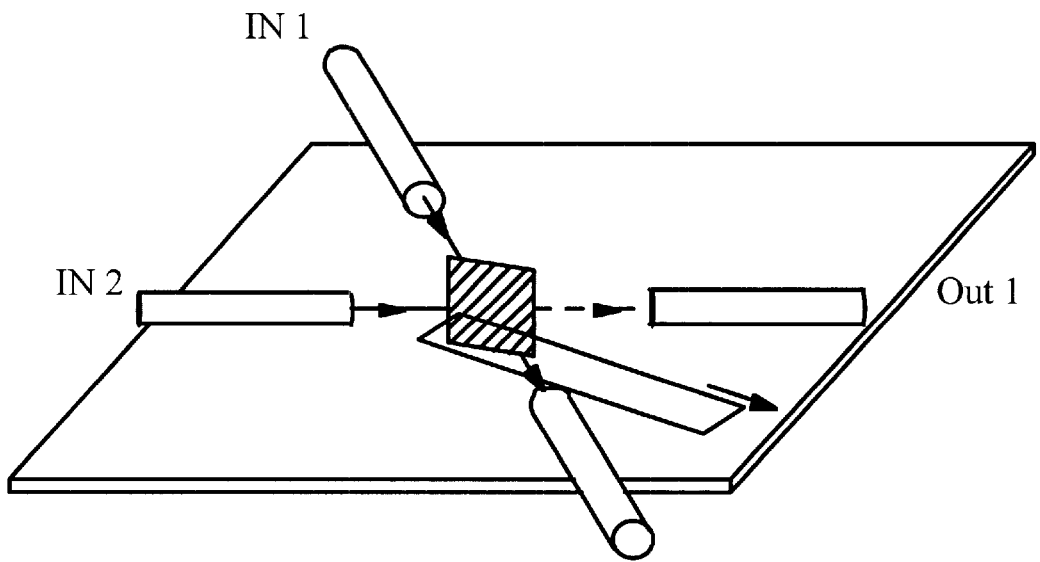
FIGS. 1A–1B depict an optical crossbar switch according to the prior art.
Figure 1B:
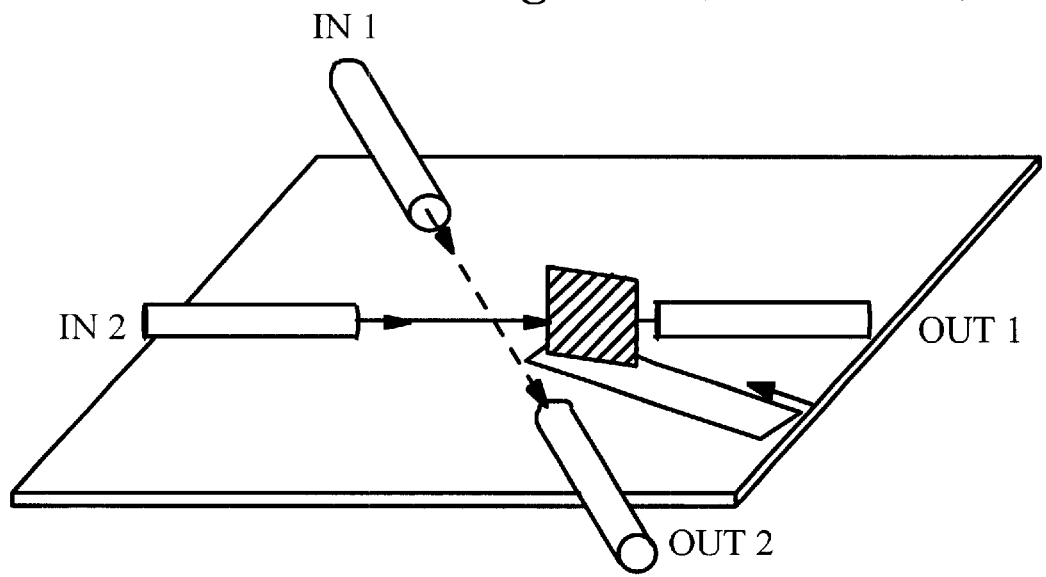
Figure 2A:
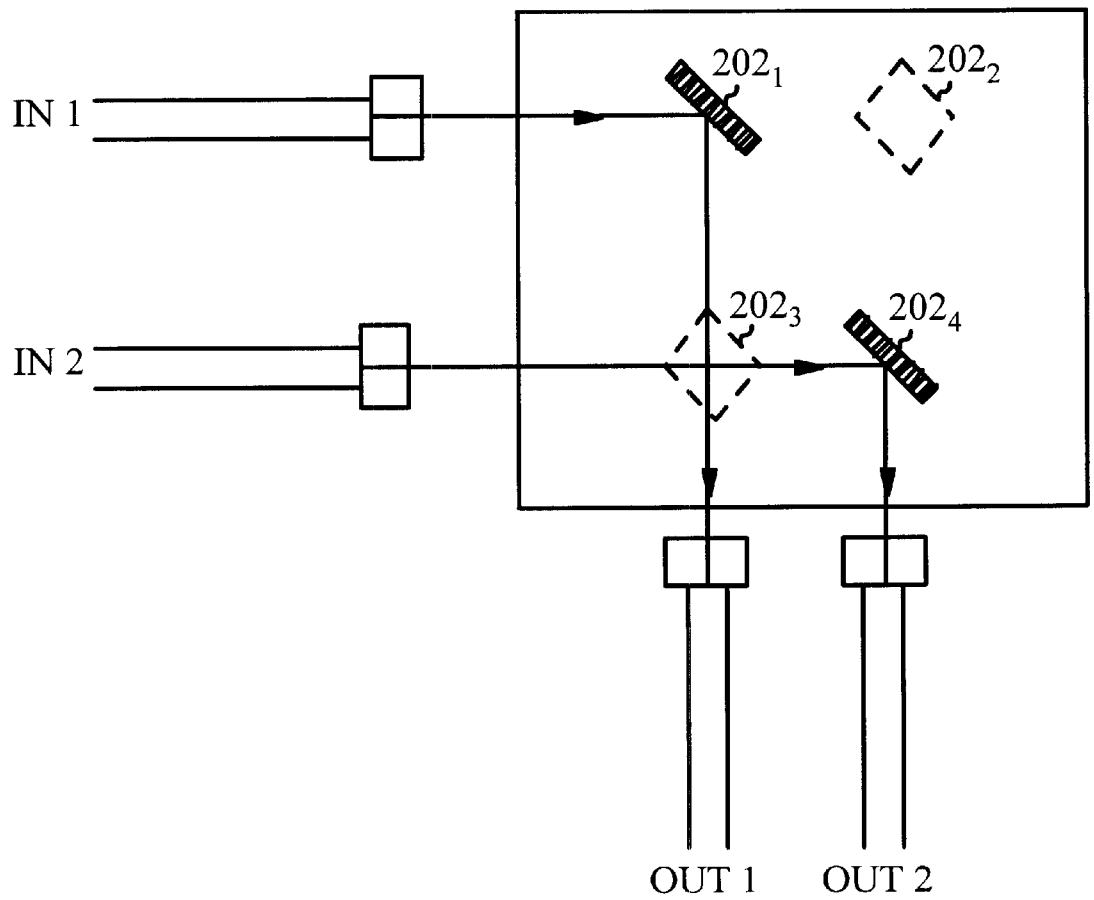
FIGS. 2A–2B depict a 2×2 crossbar switch according to prior art.
Figure 2B:
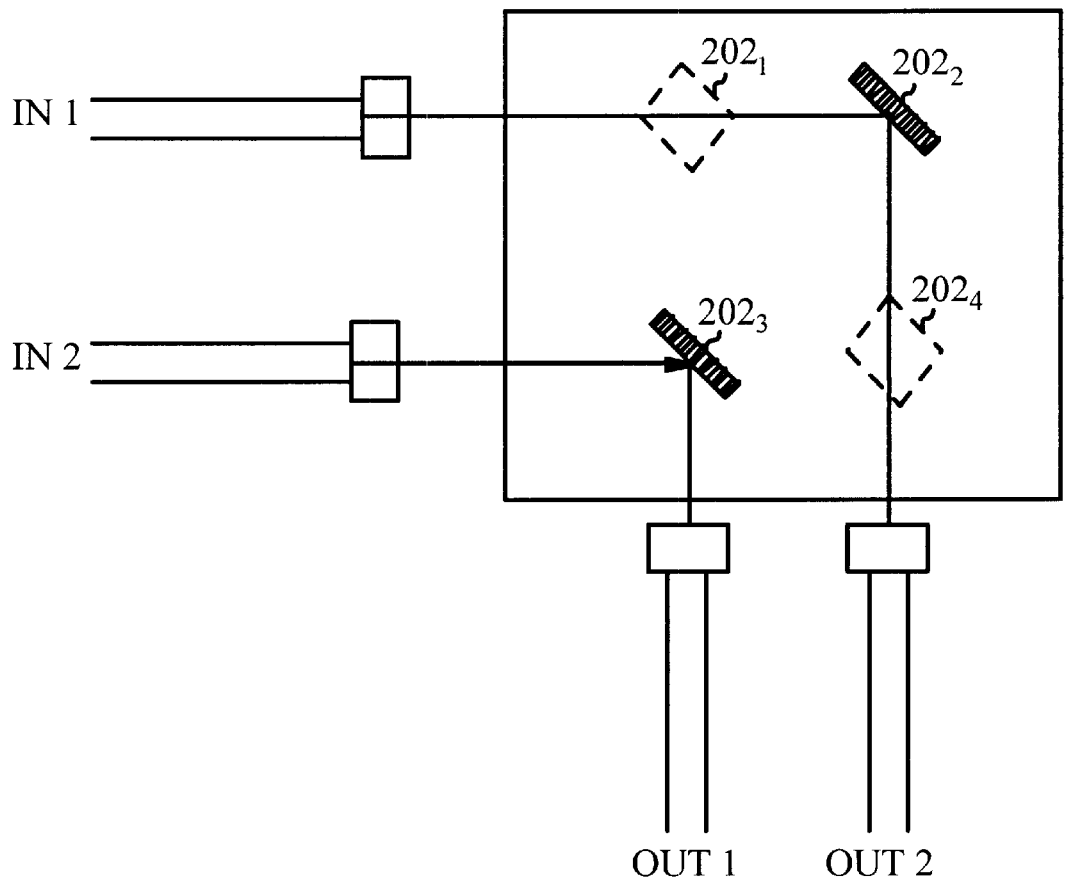
Figure 3A:
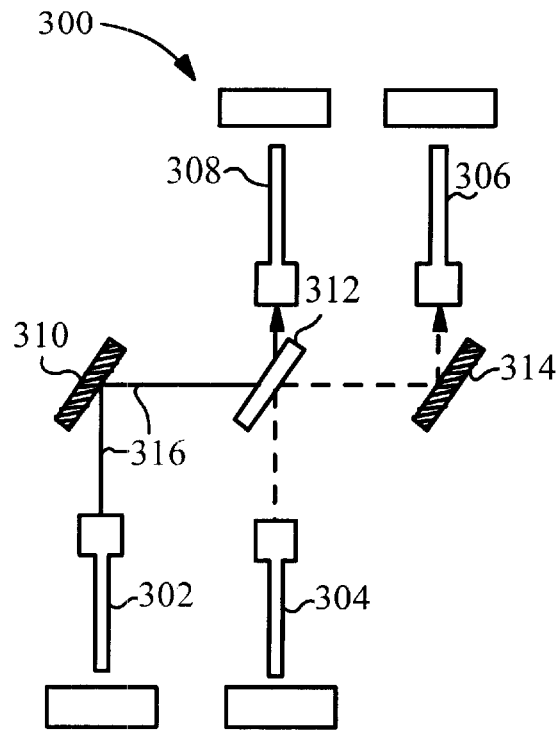
FIGS. 3A and 3B depict a 2×2 crossbar switch according to an embodiment of the present invention.
Figure 3B:
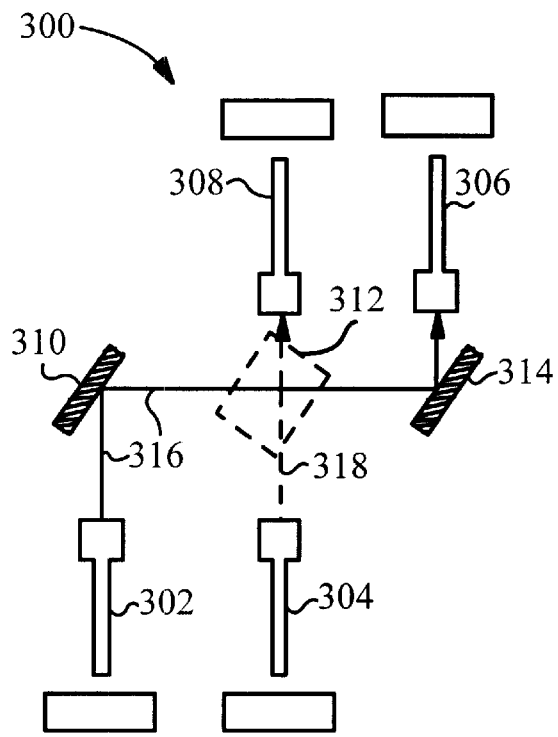

The various embodiments of the present invention are based upon a linear array of parallel mirrors, wherein fixed and movable mirrors occupy alternating positions in the array. FIGS. 3A–3B depict a simple 2×2 crossbar switch module 300 according to a first embodiment of the invention. The switch generally comprises a movable mirror 312 disposed between two fixed mirrors 310, 314. All three mirrors 310, 312, 314 are arranged substantially parallel to one another in a parallel array. The switch selectively couples optical signals between two inputs 302, 304 and two outputs 306, 308. The inputs and outputs are arranged in parallel linear arrays on opposite sides of the mirror array. The inputs 302, 304 and outputs 306, 308 usually include optical fibers coupled to collimating devices such as mircolens arrays or graded refractive index GRIN lenses. The mirrors are typically oriented at an angle of 45° with respect to an optical path of light from the inputs 302, 304. In this configuration, the mirrors deflect the path of light by 90°. This configuration greatly simplifies the alignment of the input ports 302, 304 with respect to the output ports. The crossbar switch modules can be readily fabricated in an array. Furthermore, the fabrication may be carried out in a batch process, which speeds up production and reduces the cost per device.

In a specific embodiment, moveable mirror 312 is a micromirror. The movable mirror 312 may be any suitable type of actuated mirror. For example, mirror 312 may be magnetically, electrostatically, piezoelectrically or thermally actuated. Generally, mirror 312 may be repeatably reconfigured in the path of light beams to reflect or transmit light travelling between the inputs and outputs to ensure consistent operation. The term "moveable" herein is not limited to physical movement of the mirror but also encompasses reconfiguration of the reflective properties of mirror 312. For example mirror 312 may include a liquid crystal element that changes from reflecting to transmitting under the control of a remote signal. Alternatively, mirror 312 may include a polarizer and polarization rotator, such as a faraday rotator, under the control of a remote signal. Furthermore, mirror 312 might include to refractive materials disposed on either side of a gap having a changeable refractive index. By appropriate change of the refractive index of the gap, mirror 312 may change from totally internally reflecting to transmitting or vice versa.

The operation of the switch module 300 is depicted in FIGS. 3A–3B. The two inputs 302, 304 and two outputs 306, 308 are arranged in parallel linear arrays on either side of the mirrors. Module 300 switches between a first state in which inputs 302 and 304 are coupled to outputs 308 and 306 respectively and a second state in which inputs 302 and 304 are coupled to outputs 306 and 308 respectively.

The movable mirror 312 is movable between a first position and a second position. The position of the movable mirror 312 determines which input is coupled to which output. In both positions, light 316 from the first input 302 deflects off the first fixed mirror 310. In the first position, depicted in FIG. 3A, the movable mirror 312 blocks the path of light 316 that reflects from the first fixed mirror 310. The movable mirror 312 also blocks a direct path between input 304 and output 308. The first fixed mirror 312 and the movable mirror 312 deflect light 316 from the input 302 to the output 308. The movable mirror 312 and the second fixed mirror 314 deflect light 318 from the input 304 to the output 306.

In the second position, depicted in FIG. 3B, the movable mirror 312 is retracted out of the path of light 316 from the input 302. The first fixed mirror 312 and the second fixed mirror 314 deflect light 316 from the input 302 to the output 306. Light from the input 304 travels directly to output 308. The movable mirror 312 may be configured to translate, e.g., vertically or horizontally, between the first and second positions. Alternatively, the movable mirror 312 may rotate, e.g., about a vertical or horizontal axis, between the first and second positions. Those skilled in the art will be able to devise many other ways of switching the movable mirror between the first and second positions consistent with the teachings described herein.

The basic 2×2 switch module 300 can be expanded by alternating fixed and movable mirrors in a parallel array. Thus, the basic crossbar switch module 300 can be expanded to accommodate any number of inputs and outputs. In a second embodiment of the invention, an arrayed module of N movable mirrors and N+1 fixed mirrors can accommodate 2N inputs and 2N outputs. Such arrayed modules find application in optical communications networks. Alternative applications include channel protection switching, provisioning (i.e. reconfiguring signal paths), and test instrumentation.

Figure 4:
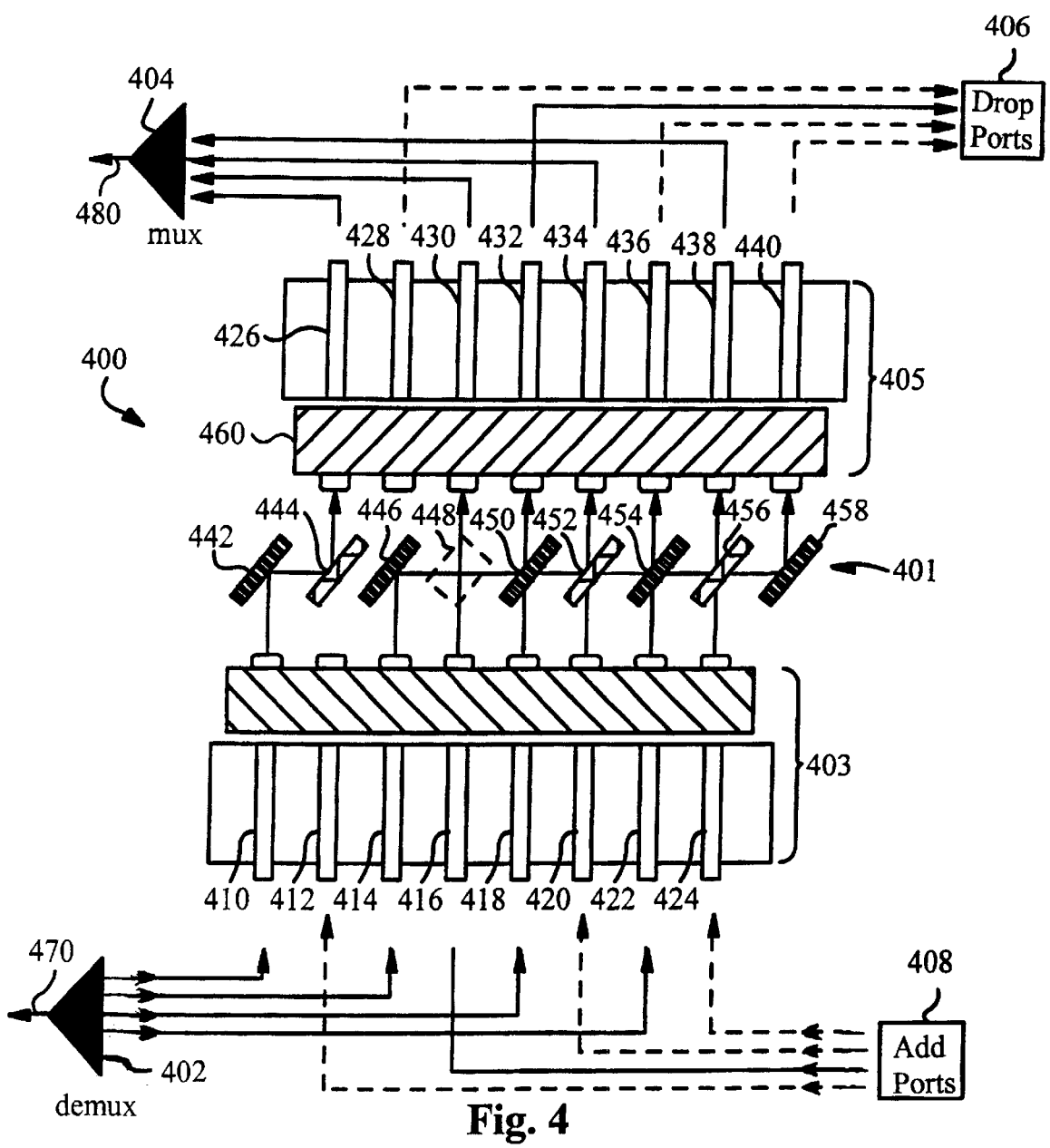
FIG. 4 depicts an apparatus according to alternative embodiments of the invention.

In a specific exemplary application, an arrayed switch module can be used to construct an optical add/drop multiplexer (OADM). FIG. 4 depicts an apparatus 400 according to a third embodiment of the invention. The apparatus generally comprises an optical switch module 401, a first collimated fiber array 403, and a second collimated fiber array 405.

The optical switch module generally comprises N movable mirrors 444, 448, 452, 456 and N+1 fixed mirrors 442, 446, 450, 454, 458 where, N is an integer greater than zero. In the exemplary embodiment depicted in FIG. 4, N=4. The fixed and movable mirrors are arranged substantially parallel to each other in a linear array in an alternating fashion with each movable mirror disposed between two neighboring fixed mirrors. The fixed and movable mirrors typically have reflecting surfaces on both their front and back sides. The two fixed mirrors 442, 458 at the ends of the mirror array may optionally have reflecting surfaces on only one side. As in FIGS. 3A–3B, each of the movable mirrors 444, 448, 452, 456 is movable between a first position and a second position. In the embodiment depicted in FIG. 4, the first collimated fiber array 403 is disposed adjacent the linear mirror array on a first side thereof. The first fiber array 403 generally comprises 2N inputs 412, 412, 414, 416, 418, 420, 422, 424. The second collimated fiber array 405 is disposed adjacent the linear mirror array on a second side thereof. The second fiber array generally comprises a 2N outputs 426, 428, 430, 432, 434, 436, 438, 440. To simplify alignment, the second collimated fiber array 405 is oriented substantially parallel to the first collimated fiber array 403. Each input or output typically includes an optical fiber optically coupled to a collimating device. The collimating device focuses light from the fiber into a parallel beam. The collimating device is typically a lens, such as a microlens, ball lens or graded refractive index (GRIN) lens. The lenses may be fabricated in an array to facilitate assembly. The fibers are fixed in a fiber holder 460. The fiber holder 460 may be, for example, a V-groove or equivalent structure. The configuration of switch module 401 takes advantage of existing lens array and fiber V-groove technology to facilitate integration of the fibers and collimators in the module, thereby reducing the difficulty and cost associated with alignment, assembly, and packaging.

The operation of the switch module has features in common with those shown and described above with respect to FIGS. 3A–3B. Specifically, the fixed and movable mirrors are configured such that, when an $i^{th}$ movable mirror is in a first position, light from a $j^{th}$ input is deflected by an $i^{th}$ fixed mirror and an $i^{th}$ movable mirror to a $j^{th}$ output. Furthermore, when the $i^{th}$ movable mirror is in the first position, light from a $(j+1)^{th}$ input is deflected by an $(i+1)^{th}$ fixed mirror and the $i^{th}$ movable mirror to a $(j+1)^{th}$ output. Here, i is an integer greater than zero and less than or equal to N and $j=2i-1$. Those skilled in the art will recognize that when the $i^{th}$ movable mirror is in the second position, light from the $j^{th}$ input is deflected by the $i^{th}$ fixed mirror and the $(i+1)^{th}$ fixed mirror to the $(j+1)^{th}$ output and light from the $(j+1)^{th}$ input travels directly to the $j^{th}$ output.

For example in FIG. 4 the first, third and fourth movable mirrors 444, 452 and 456 are in the first position and the second movable mirror 448 is in the second position. Light from first input 410 deflects off the first fixed mirror 442 and the front surface of first movable mirror 444 towards the output 426. Light from the second input 412 deflects off the back surface of the first movable mirror 444 and the second fixed mirror 446 towards the second output 428. Because, the second movable mirror is in the second position, light from the third input 418 couples to the fourth output 432 via the second and third fixed mirrors 446, 450. Light from the fourth input 416 couples directly to the third output 430. Light from the fifth input 418 couples to the fifth output 434 via the third fixed mirror 450 and the third movable mirror 452. Light from the sixth input 420 couples to the sixth output 426 via the third movable mirror 452 and the fourth fixed mirror 454.

The apparatus 400 described above may implement a reconfigurable optical add/drop multiplexer (OADM). The OADM further includes the apparatus 400, a demultiplexer 402 coupled to the first collimated fiber array 403, and a multiplexer 404 coupled to the second collimated fiber array 405. The demultiplexer 402 receives a multiplexed optical signal from an input fiber 470. The multiplexed signal typically contains two or more distinct channels that carry separate optical signals. For example, a wavelength division multiplexed (WDM) signal contains different channels distinguished by different wavelengths $\lambda_1$–$\lambda_4$. The demultiplexer distributes the different channels in the multiplexed signal to the inputs in the first collimated fiber array 403 according to their respective wavelengths. The multiplexer 404 receives the signals from the outputs in the second collimated fiber array 403 and combines them into a single output signal, which is transmitted to an output fiber 480.

The OADM may optionally include a number of add ports 406 and drop ports 408. The add ports 406 allow locally generated signals to be transmitted to the output fiber 480. The drop ports 408 allow selected channels of the input signal from the input fiber 470 to be directed to one or more local devices. Typically a first N of the 2N inputs receives signals from the demultiplexer, while a first N of the outputs transmits signals to the multiplexer. A second N of the inputs receives local signals from the add ports while a second N of the outputs transmits signals to the drop ports. For example, in FIG. 4 input ports 410, 414, 418, 422 are coupled to the demultiplexer and input ports 412, 416, 420, 424 are coupled to the add ports 406. Output ports 426, 430, 434, 438 are coupled to the multiplexer and output ports 428, 432, 436, 440 are coupled to the drop ports 408. Those skilled in the art will recognize that this particular configuration allows a signal from the multiplexer to be selectively routed to either the output fiber or a local device connected to a drop port. Furthermore, a signal from an add port may be selectively routed to either the output fiber or a drop port.

Figure 5:
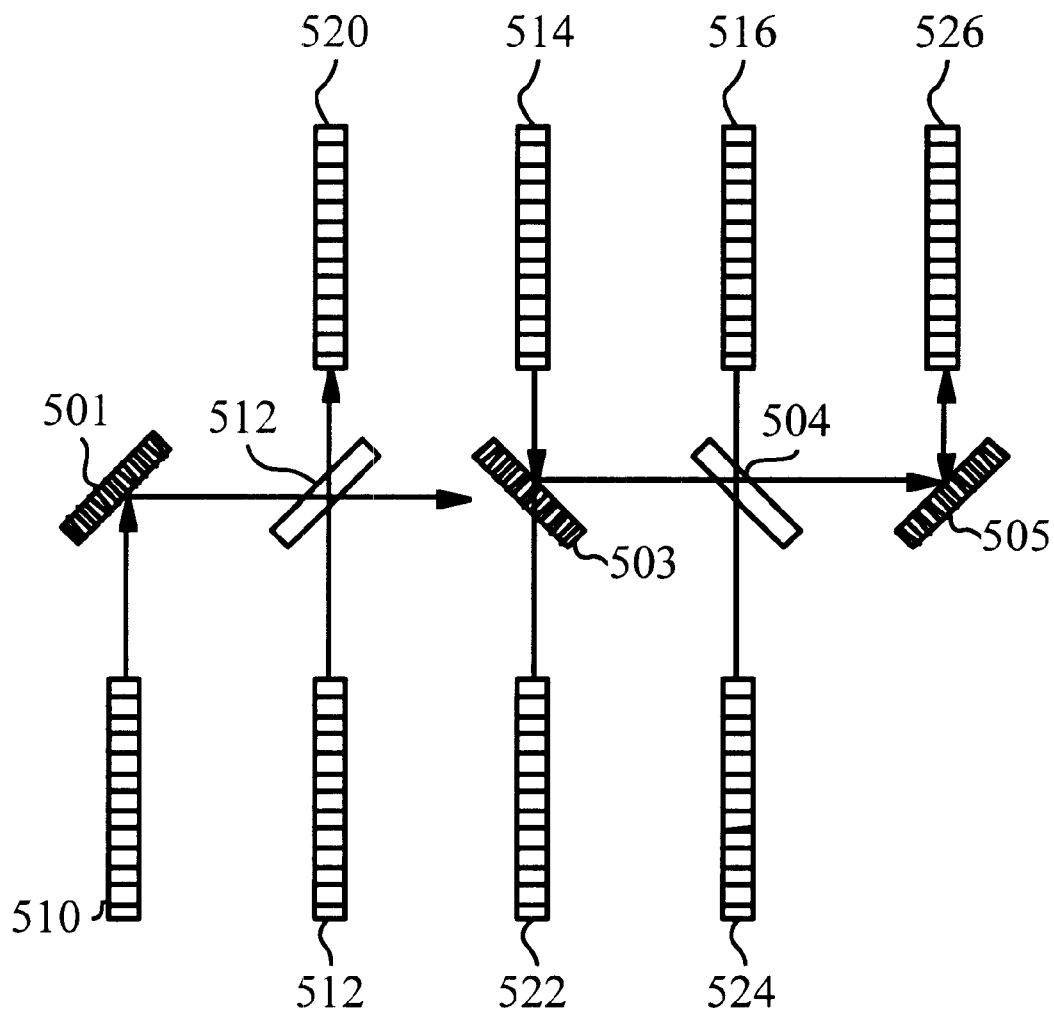
FIG. 5 depicts an apparatus according to another alternative embodiment of the present invention.

The present invention is not limited to arrays of parallel mirrors. Other possible mirror arrays are within the scope of the invention. Furthermore, at least some of the input ports could be on the same side of the mirror array as the output ports. For example, FIG. 5 depicts an optical switch module 500 in which some of the fixed and movable mirrors are perpendicular to each other. Module 500 generally comprises fixed mirrors 501, 503, 505, movable mirrors 502, 504, inputs 510, 512, 514, 516 and outputs 520, 522, 524, 526. Alternate fixed mirrors are perpendicular to each other. Similarly, alternate movable mirrors are perpendicular to each other. This arrangement allows inputs 510, 512 to be located on the same side of the mirrors as outputs 522, 524. Furthermore, inputs 514, 516 and outputs 520, 526 are located on the other side of the mirror array.

It will be clear to one skilled in the art that the above embodiment may be altered in many ways without departing from the scope of the invention. For example, the switch may be configured such that all the inputs and all the outputs are on one side of the mirror array. Furthermore, the switch module may be configured with 2 fixed mirrors and N−1 moveable mirrors to form one or two 1×N switches. Accordingly, the scope of the invention should be determined by the following claims and their legal equivalents.

What is claimed is:

1. An optical switch module, comprising:
   a) at least two fixed mirrors; and
   b) at least one movable mirror, movable between a first position and a second position;
   wherein the at least two fixed mirrors and the at least one movable mirror are configured such that, when the at least one movable mirror is in the first position, light from a first input is deflected by a first of the fixed mirrors and the movable mirror to a first output and light from a second input is deflected by a second of the fixed mirrors and the movable mirror to a second output.

2. The module of claim 1 wherein, when the at least one movable mirror is in a second position, light from the first input is deflected by the first and second fixed mirrors to the second output and light from a second input travels directly to a second output.

3. The module of claim 1 wherein the movable mirror includes a front reflecting surface and a back reflecting surface.

4. The module of claim 1 wherein the movable mirror is configured to translate between the first position and the second position.

5. The module of claim 1 wherein the movable mirror is configured to rotate between the first position and the second position.

6. The module of claim 1 wherein, the at least one movable mirror and the at least two fixed mirrors are arranged substantially parallel to each other in a linear array.

7. The module of claim 6 wherein the first and second inputs are arranged substantially parallel to each other on a first side of the linear array.

8. The module of claim 7 wherein first and second outputs are arranged substantially parallel to each other on a second side of the linear array.

9. The module of claim 1 wherein the at least one movable mirror comprises N movable mirrors and the at least two fixed mirrors comprises N+1 fixed mirrors, wherein N is an integer greater than 1.

10. The module of claim 9 wherein, the N movable mirrors and the N+1 fixed mirrors are arranged substantially parallel to each other in a linear array wherein the fixed and movable mirrors occupy alternate positions in the array.

11. The module of claim 1, wherein the at least one movable mirror comprises a microelectromechanical device.

12. The module of claim 1, configured as a 2×2 optical switch.

13. An optical switching apparatus, comprising:
   a) N movable mirrors arranged substantially parallel to each other in a linear array, wherein each of the movable mirrors is movable between a first position and a second position and N is an integer greater than zero;
   b) N+1 fixed mirrors are arranged substantially parallel to each other in the linear array such that the fixed and movable mirrors occupy alternate positions in the array; and
   c) a first collimated fiber array having 2N inputs disposed adjacent the linear array on a first side thereof; and
   d) a second collimated fiber array having 2N outputs disposed adjacent the linear array on a second side thereof,
   wherein the fixed and movable mirrors are configured such that, when an $i^{th}$ movable mirror is in the first position, light from an $j^{th}$ input is deflected by an $i^{th}$ fixed mirror and an $i^{th}$ movable mirror to an $j^{th}$ output and light from a $(j+1)^{th}$ input is deflected by an $(i+1)^{th}$ fixed mirror and the $i^{th}$ movable mirror to a $(j+_1)^{th}$ output, wherein i is an integer greater than zero and less than or equal to N and $j=2i-1$.

14. The apparatus of claim 13 wherein the fixed and movable mirrors are configured such that, when the $i^{th}$ movable mirror is in the second position, light from the $j^{th}$ input is deflected by the $i^{th}$ fixed mirror and the $(i+1)^{th}$ fixed mirror to the $(j+1)^{th}$ output and light from an $(j+1)^{th}$ input travels directly to the $j^{th}$ output.

15. The apparatus of claim 13 wherein the first and second collimated fiber arrays are substantially parallel to each other.

16. The apparatus of claim 13 further comprising an optical demultiplexer optically coupled to two or more of the inputs in the first collimated fiber array.

17. The apparatus of claim 13 further comprising at least two add ports optically coupled to two or more of the inputs in the first collimated fiber array.

18. The apparatus of claim 13 further comprising an optical multiplexer optically coupled to at least two of the outputs in the second collimated fiber array.

19. The apparatus of claim 13 further comprising at least one drop port optically coupled to at least one of the outputs in the second collimated fiber array.

20. A method for fabricating an optical switch module, comprising:
   a) providing at least two fixed mirrors;
   b) providing at least one movable mirror, wherein the at least one movable mirror is movable between a first position and a second position;
   c) providing at least two optical inputs;
   d) providing at least two optical outputs;
   wherein the at least one movable mirror and the at least two fixed mirrors are configured such that, when the at least one movable mirror is in the first position, light from a first input is deflected by a first of the fixed mirrors and the movable mirror to a first output and light from a second input is deflected by a second of the fixed mirrors and the movable mirror to a second output.

21. The method of claim 20 wherein the at least two fixed mirrors are substantially parallel to each other.

22. The method of claim 21 wherein the at least one movable mirror is substantially parallel to the at least two fixed mirrors.

23. The method of claim 20 wherein the fixed and movable mirrors are arranged in a linear array, wherein the at least one movable mirror is disposed between the at least two fixed mirrors.

24. The method of claim 20 wherein the first and second inputs are oriented substantially parallel to the first and second outputs.

25. The method of claim 20 further comprising:
coupling an optical fiber to each of the at least two inputs.

26. The method of claim 20 further comprising coupling an optical fiber to each of the at least two outputs.

27. The method of claim 25 or 26 wherein the optical fiber is part of a collimated fiber array.

28. The method of claim 27 wherein the fiber array is a V-groove array.

29. The method of claim 20 wherein the at least one movable mirror comprises N movable mirrors arranged parallel to each other in a linear array, wherein N is an integer greater than 1.

30. The method of claim 22 wherein the at least two fixed mirrors comprises N+1 fixed mirrors arranged parallel to the movable mirrors in the linear array and fixed and movable mirrors alternate in the linear array.

31. An optical add/drop multiplexer, comprising:
   a) N movable mirrors arranged substantially parallel to each other in a linear array, wherein each of the movable mirrors is movable between a first position and a second position and N is an integer greater than zero;
   b) N+1 fixed mirrors arranged substantially parallel to each other and substantially parallel to the N movable mirrors in the linear array, wherein the fixed and movable mirrors occupy alternate positions in the array;
   c) a first collimated fiber array having 2N inputs disposed adjacent the linear array on a first side thereof;
   d) a second collimated fiber array having 2N outputs disposed adjacent the linear array on a second side thereof, wherein the second collimated fiber array is substantially parallel to the first collimated fiber array;
   e) an optical demultiplexer optically coupled to a first N of the inputs in the first collimated fiber array;
   f) N add ports coupled to a second N of the inputs in the first collimated fiber array;
   g) an optical multiplexer optically coupled to a first N of the outputs in the second collimated fiber array; and
   h) N drop ports coupled to a second N of the outputs in the second collimated fiber array.

32. The add/drop multiplexer of claim 31, wherein the fixed and movable mirrors are configured such that, when an $i^{th}$ movable mirror is in the first position, light from an $j^{th}$ input port is deflected by an $i^{th}$ fixed mirror and an $i^{th}$ movable mirror to an $j^{th}$ output and light from a $(j+_1)^{th}$ input is deflected by an $(i+1)^{th}$ fixed mirror and the $i^{th}$ movable mirror to a $(j+_1)^{th}$ output, wherein i is an integer greater than zero and less than or equal to N and $j=2i-1$.

33. The add/drop multiplexer of claim 32, wherein the fixed and movable mirrors are configured such that, when the $i^{th}$ movable mirror is in the second position, light from the $j^{th}$ input is deflected by the $i^{th}$ fixed mirror and the $(i+1)^{th}$ fixed mirror to the $(j+1)^{th}$ output and light from an $(j+1)^{th}$ input travels directly to the $j^{th}$ output.

34. The add/drop multiplexer of claim 32 wherein the $j^{th}$ input is coupled to the demultiplexer.

35. The add/drop multiplexer of claim 32 wherein the $(j+1)^{th}$ input is coupled to one of the add ports.

36. The add/drop multiplexer of claim 32 wherein the $j^{th}$ output is coupled to the multiplexer.

37. The add/drop multiplexer of claim 32 wherein the $(j+1)^{th}$ output is coupled to one of the drop ports.

38. The add/drop multiplexer of claim 32 configured to implement wavelength division multiplexing.

* * * * *

UNITED STATES PATENT AND TRADEMARK OFFICE
CERTIFICATE OF CORRECTION

PATENT NO.    : 6,449,407 B1
DATED         : September 10, 2002
INVENTOR(S)   : Meng-Hsiung Kiang et al.

It is certified that error appears in the above-identified patent and that said Letters Patent is hereby corrected as shown below:

<u>Title page, Item [54] and Column 1, lines 1 & 2,</u>
The title should read -- OPTICAL SWITCHING APPARATUS AND METHOD OF ASSEMBLY --

Signed and Sealed this

Twenty-eighth Day of January, 2003

JAMES E. ROGAN
*Director of the United States Patent and Trademark Office*